US012253251B1

(12) United States Patent
Luo et al.

(10) Patent No.: US 12,253,251 B1
(45) Date of Patent: Mar. 18, 2025

(54) CASING ASSEMBLY AND MONITOR

(71) Applicant: WISTRON CORP., New Taipei (TW)

(72) Inventors: Bin Luo, New Taipei (TW); Ruihua Wang, New Taipei (TW); Zhiyi Liang, New Taipei (TW); chia-jang Chen, New Taipei (TW); chih chou Chou, New Taipei (TW)

(73) Assignee: WISTRON CORP., New Taipei (TW)

( * ) Notice: Subject to any disclaimer, the term of this patent is extended or adjusted under 35 U.S.C. 154(b) by 0 days.

(21) Appl. No.: 18/598,061

(22) Filed: Mar. 7, 2024

(30) Foreign Application Priority Data

Jan. 4, 2024 (CN) ......................... 202410017749.0

(51) Int. Cl.
*F21V 33/00* (2006.01)
*F21V 5/00* (2018.01)
*F21Y 107/30* (2016.01)
*F21Y 113/00* (2016.01)
*F21Y 115/10* (2016.01)

(52) U.S. Cl.
CPC ............ *F21V 33/0052* (2013.01); *F21V 5/00* (2013.01); *F21Y 2107/30* (2016.08); *F21Y 2113/00* (2013.01); *F21Y 2115/10* (2016.08)

(58) Field of Classification Search
CPC ........ F21V 33/0052; F21V 5/00; F21V 15/01; F21Y 2107/30; F21Y 2115/10; F21Y 2113/00; G02F 1/1336; G02F 1/133618
See application file for complete search history.

(56) References Cited

U.S. PATENT DOCUMENTS

2006/0209527 A1 9/2006 Shin
2010/0091193 A1 4/2010 Hoogenstraaten
2011/0116258 A1* 5/2011 Ma ...................... F21V 33/0052 362/217.13
2011/0194274 A1* 8/2011 Kwisthout .......... F21V 33/0052 362/97.1
2018/0073720 A1* 3/2018 Bruyneel .................. F21V 7/22

FOREIGN PATENT DOCUMENTS

CN 109147562 A 1/2019

OTHER PUBLICATIONS

TW Office Action dated Dec. 2, 2024 in Taiwan application No. 113101859.

* cited by examiner

*Primary Examiner* — Bao Q Truong
(74) *Attorney, Agent, or Firm* — McClure, Qualey & Rodack, LLP

(57) ABSTRACT

A casing assembly includes a casing and a light emitting module. The casing is provided with an accommodation recess formed by an inner wall surface and a light outlet portion formed by two inner peripheral edges. The accommodation recess communicates with the light outlet portion. The light emitting module is disposed in the accommodation recess of the casing and located close to the light outlet portion. The light emitting module is provided with a light emitting surface, and a normal line of the light emitting surface is non-parallel and non-perpendicular to an opening direction of the light outlet portion.

20 Claims, 12 Drawing Sheets

CASING ASSEMBLY AND MONITOR

CROSS-REFERENCE TO RELATED APPLICATIONS

This non-provisional application claims priority under 35 U.S.C. § 119 (a) on Patent Application No(s). 202410017749.0 filed in China on Jan. 4, 2024, the entire contents of which are hereby incorporated by reference.

TECHNICAL FIELD

The disclosure relates to a casing assembly and a monitor.

BACKGROUND

In order to improve user experience of watching monitors, monitor manufacturers generally provide an additional LED light strip on a back cover of a monitor, or arrange LEDs inside the monitor and expose them to outside from openings of the back cover of the monitor. By doing so, light emitted by the LED light strip or LEDs in an on mode can be projected on a wall behind the monitor, thereby forming a halo atmosphere effect.

However, when the LED light strip or LEDs in an off mode (not emit light), the LED light strip or LEDs are directly visible to naked eyes, and thus the LED light strip or LEDs adversely affect the aesthetics of the overall appearance of the monitor. Therefore, how to address the aforementioned issue is one of the crucial topics in this field.

SUMMARY

The disclosure provides a casing assembly and a monitor which can prevent the LED light strip or LEDs from adversely affecting the overall appearance of the monitor.

One embodiment of the disclosure provides a casing assembly. The casing assembly includes a casing and a light emitting module. The casing is provided with an accommodation recess formed by an inner wall surface and a light outlet portion formed by two inner peripheral edges. The accommodation recess communicates with the light outlet portion. The light emitting module is disposed in the accommodation recess of the casing and located close to the light outlet portion. The light emitting module is provided with a light emitting surface, and a normal line of the light emitting surface is non-parallel and non-perpendicular to an opening direction of the light outlet portion.

Another embodiment of the disclosure provides a monitor. The monitor includes a casing assembly and a display panel. The casing assembly includes a casing and a light emitting module. The casing is provided with an accommodation recess formed by an inner wall surface and a light outlet portion formed by two inner peripheral edges. The accommodation recess communicates with the light outlet portion. The light emitting module is disposed in the accommodation recess of the casing and located close to the light outlet portion. The light emitting module is provided with a light emitting surface, and a normal line of the light emitting surface is non-parallel and non-perpendicular to an opening direction of the light outlet portion. The display panel is disposed on the casing.

According to the casing assembly and the monitor as discussed in the above embodiments, the light emitting module is hidden in the accommodation recess of the casing and is disposed close to the light outlet portion, and the normal line of the light emitting surface of the light emitting module is non-parallel and non-perpendicular to the opening direction of the light outlet portion of the casing, which allows the light emitting module not to right face the light outlet portion, but still enables light emitted therefrom to pass through the light outlet portion. As a result, when a user watches the accommodation recess through the light outlet portion along the opening direction of the light outlet portion, it is uneasy to see the light emitting module. Therefore, when the light emitting module does not emit light, the appearance of the monitor can be prevented from being affected by the light emitting module, thereby maintaining the aesthetic appearance of the entire monitor.

BRIEF DESCRIPTION OF THE DRAWINGS

The present disclosure will become better understood from the detailed description given herein below and the accompanying drawings which are given by way of illustration only and thus are not intending to limit the present disclosure and wherein:

FIG. 7 is a partial and enlarged perspective view of the light permeable component in

FIG. 6;

DETAILED DESCRIPTION

Figure 1:
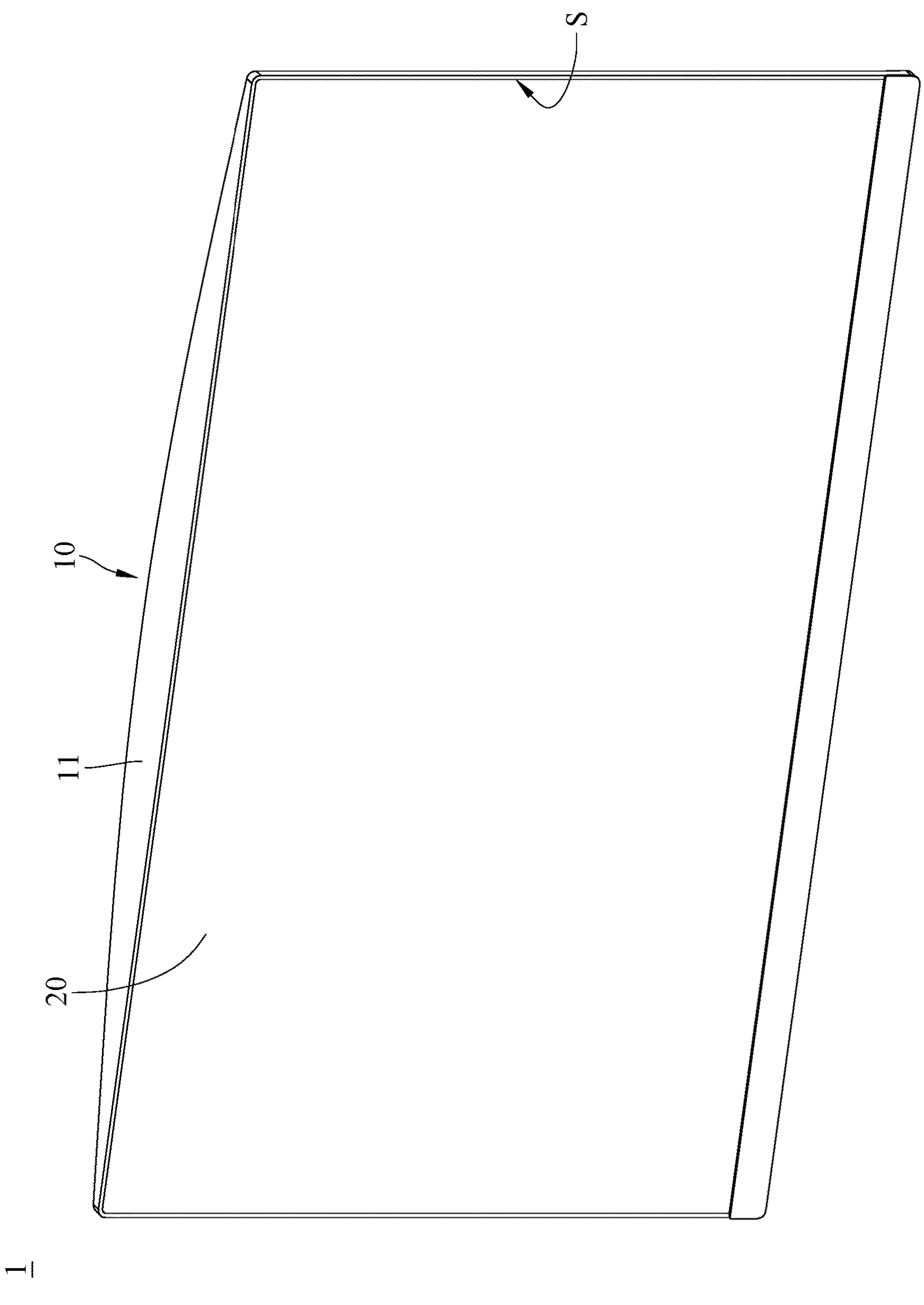
FIG. 1 is a perspective view of a monitor according to a first embodiment of the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

In addition, the terms used in the present disclosure, such as technical and scientific terms, have its own meanings and can be comprehended by those skilled in the art, unless the terms are additionally defined in the present disclosure. That is, the terms used in the following paragraphs should be read on the meaning commonly used in the related fields and will not be overly explained, unless the terms have a specific meaning in the present disclosure.

Figure 2:
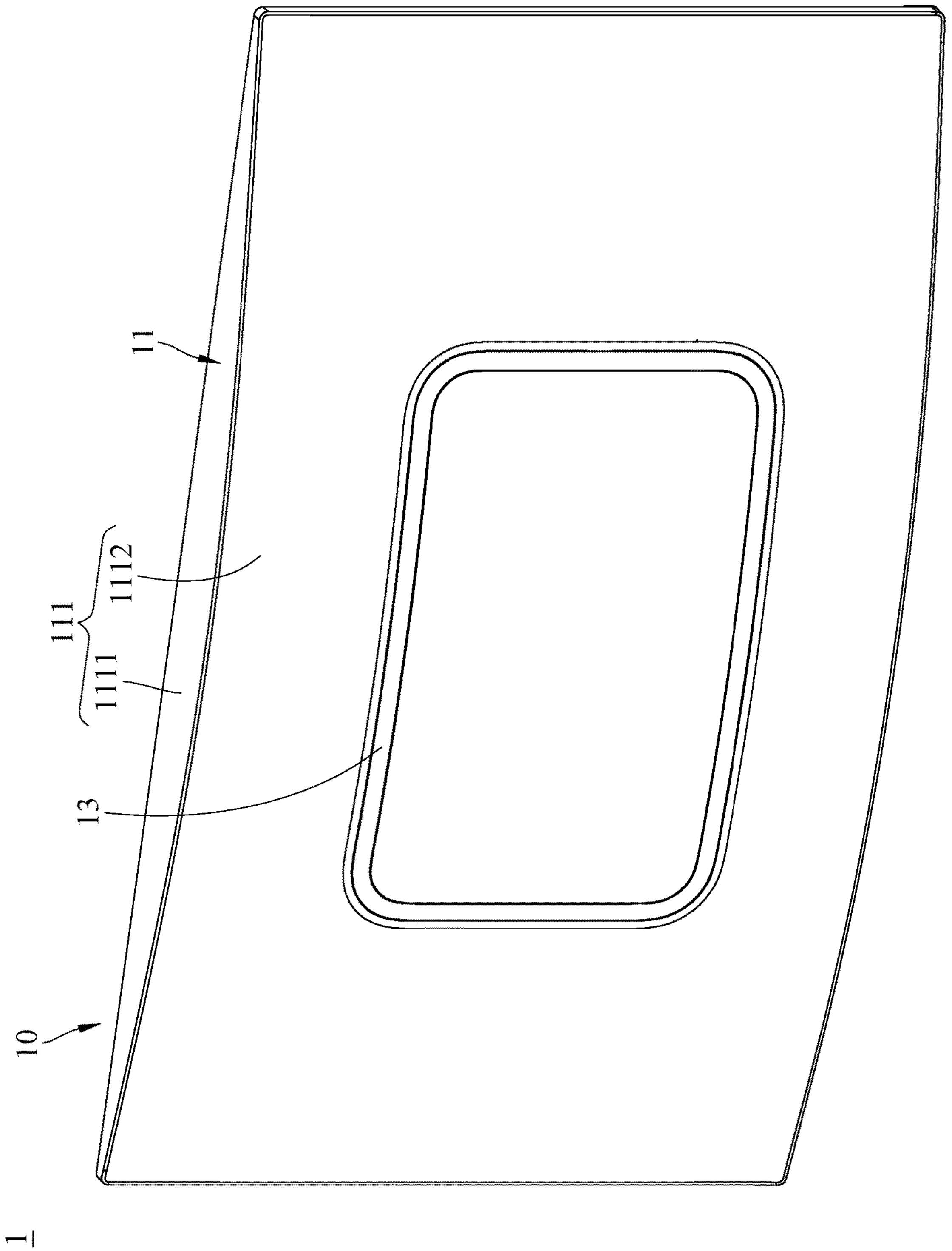
FIG. 2 is another perspective view of the monitor in FIG. 1.
Figure 3:
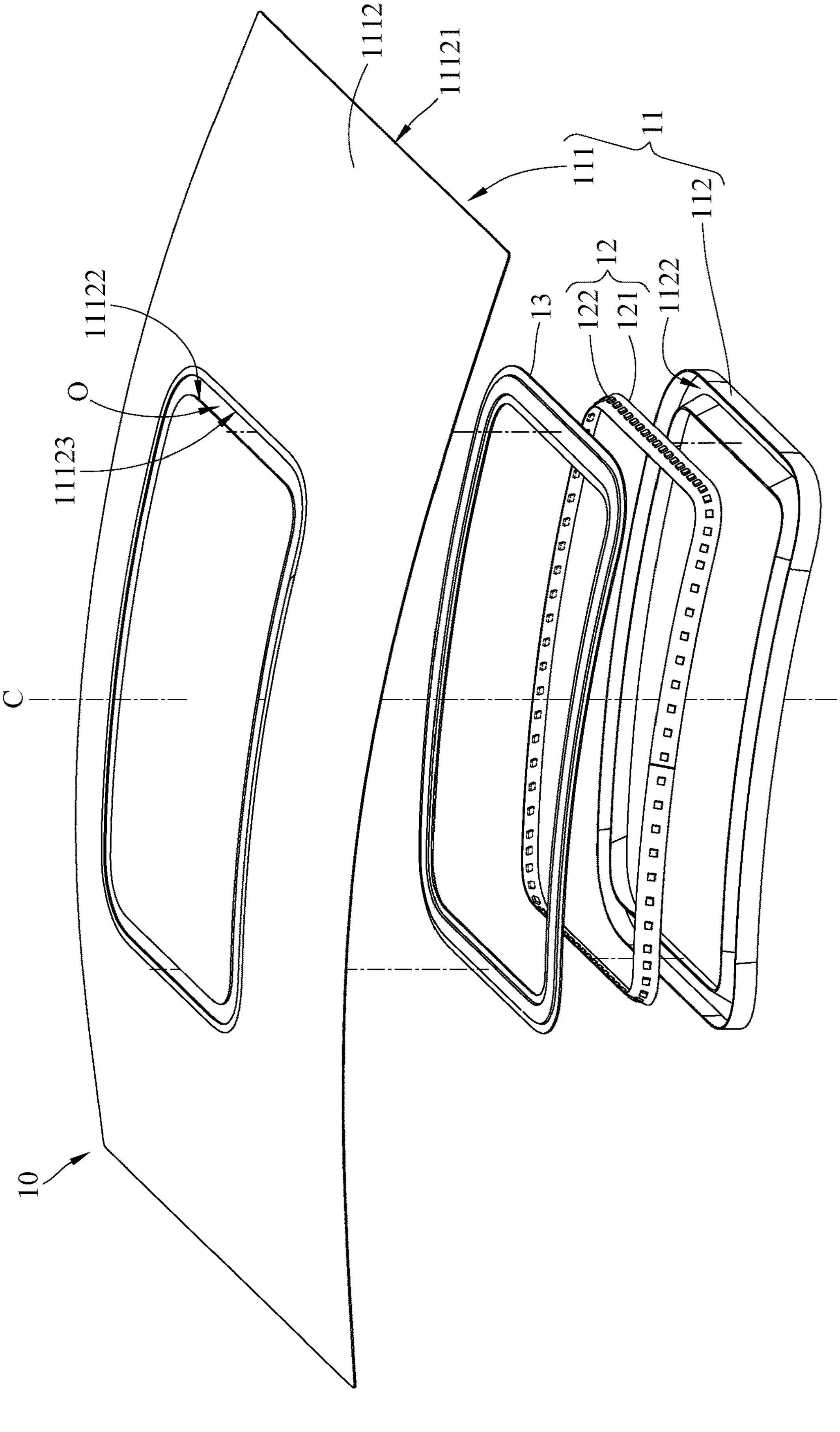
FIG. 3 is an exploded view of a back cover, an accommodation component, a light emitting module and a permeable component in FIG. 2.

Referring to FIGS. 1 to 3, FIG. 1 is a perspective view of a monitor 1 according to a first embodiment of the disclosure, FIG. 2 is another perspective view of the monitor 1 in FIG. 1, and FIG. 3 is an exploded view of a back cover 1112, an accommodation component 112, a light emitting module 12 and a light permeable component 13 in FIG. 2.

In this embodiment, the monitor 1 includes a casing assembly 10 and a display panel 20. The casing assembly 10 includes a casing 11 and a light emitting module 12. In addition, the casing assembly 10 may further include a light permeable component 13.

The casing 11 includes a main body 111 and an accommodation component 112. The main body 111 includes a frame 1111 and a back cover 1112 assembled with each other. An inner wall of the frame 1111 and an inner wall of the back cover 1112 together form an inner space S. The display panel 20 is at least partially disposed in the inner space S and is exposed to outside from the frame 1111.

Figure 4:
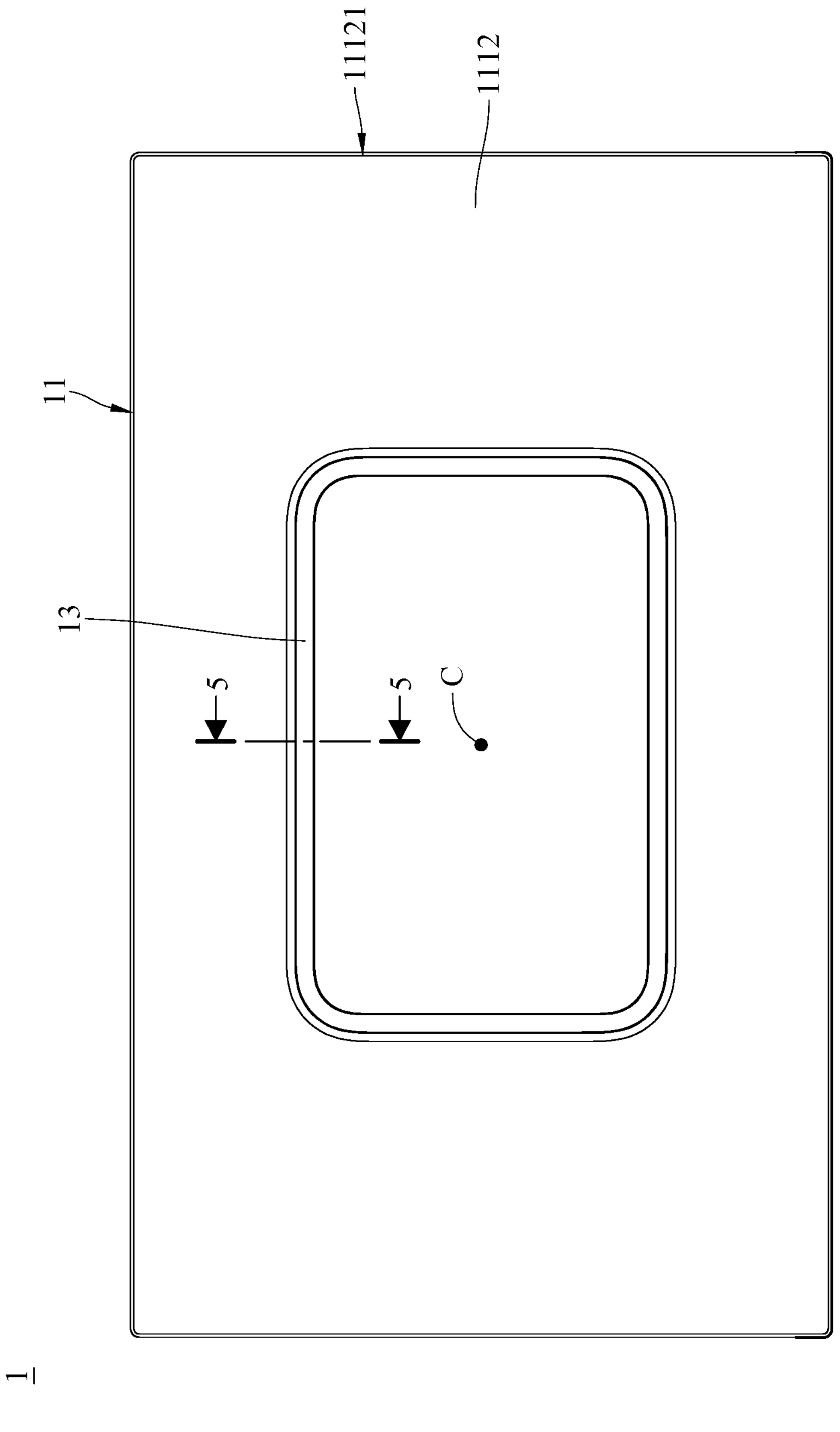
FIG. 4 is a rear view of the monitor in FIG. 2.
Figure 5:
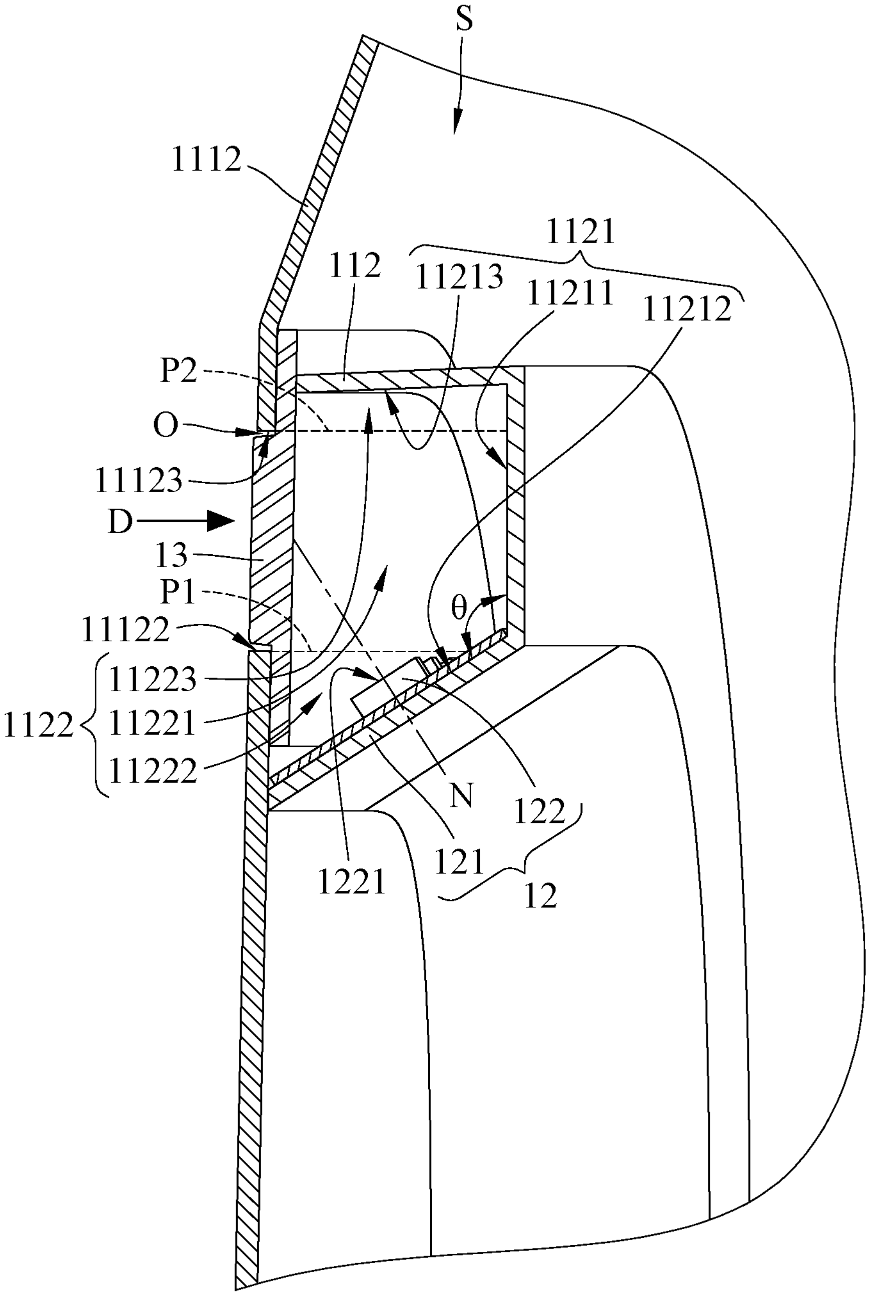
FIG. 5 is a partial cross-sectional view of the monitor in FIG. 4 taken along a line 5-5.

Then, referring to FIGS. 3 to 5, FIG. 4 is a rear view of the monitor 1 in FIG. 2, and FIG. 5 is a partial cross-sectional view of the monitor 1 in FIG. 4 taken along a line 5-5.

The back cover 1112 includes an outer peripheral edge 11121 and a light outlet portion O. The light outlet portion O is in a ring shape and surrounds a central line C, and the light outlet portion O may be a ring-shaped through hole formed on the back cover 1112. The light outlet portion O has two inner peripheral edges 11122 and 11123 located opposite to each other. The accommodation component 112 is, for example, in a ring shape and surrounds the central line C. The accommodation component 112 is fixed to the back cover 1112 and is located in the inner space S. The accommodation component 112 has an accommodation recess 1122 formed by an inner wall surface 1121. The inner wall surface 1121, for example, includes an inner bottom surface 11211, a first inner side surface 11212 and a second inner side surface 11213. The first inner side surface 11212 and the second inner side surface 11213 are respectively connected to two opposite sides of the inner bottom surface 11211, and the first inner side surface 11212 is located farther away from the outer peripheral edge 11121 than the second inner side surface 11213. The first inner side surface 11212 is at an obtuse angle θ to the inner bottom surface 11211, and the obtuse angle θ, for example, falls within a range from 135 degrees to 160 degrees. For instance, the obtuse angle θ may be 135, 150 or 160 degrees. The first inner side surface 11212 and the second inner side surface 11213 are, for example, in an angular relationship; that is, the first inner side surface 11212 is, for example, non-parallel to the second inner side surface 11213.

In some embodiments, the accommodation recess 1122 is divided into an exposed area 11221 and two hidden areas 11222 and 11223 by two imaginary extension surfaces P1 and P2 which extend from the inner peripheral edges 11122 and 11123 towards the inner bottom surface 11211, where the exposed area 11221 communicates with the light outlet portion O. The imaginary extension surfaces P1 and P2 may be perpendicular to the inner bottom surface 11211, but the disclosure is not limited thereto. In other words, a portion of the accommodation recess 1122 which is defined by the imaginary extension surfaces P1 and P2 from the inner peripheral edges 11122 and 11123, the inner bottom surface 11211 and a part of the first inner side surface 11212 is the exposed area 11221, another portion of the accommodation recess 1122 which is defined by the imaginary extension surface P2 from the inner peripheral edge 11123, a part of the inner bottom surface 11211 and the second inner side surface 11213 is the hidden area 11223, and the other portion of accommodation recess 1122 which is defined by the imaginary extension surface P1 from the inner peripheral edge 11122 and the first inner side surface 11212 is the hidden area 11222.

In this embodiment, the frame 1111 and the back cover 1112 of the main body 111 and the accommodation component 112 of the casing 11 are separate pieces and assembled with one another, but the disclosure is not limited thereto; in some other embodiments, the frame and the back cover of the main body and the accommodation component of the casing may be made of a single piece.

The light emitting module 12 is, for example, in a ring shape and surrounds the central line C. The light emitting module 12 is disposed on the first inner side surface 11212. More specifically, the light emitting module 12 is disposed close to the light outlet portion O and is located in the hidden area 11222 of the accommodation recess 1122. The light emitting module 12 includes a circuit board 121 and a plurality of light emitting units 122 disposed on the circuit board 121. The light emitting units 122 are, for example, light emitting diodes (i.e., LEDs). Each of the light emitting units 122 is provided with a light emitting surface 1221, where the light emitting surface 1221 faces the light outlet portion O, and a normal line N of the light emitting surface 1221 is non-parallel and non-perpendicular to an opening direction D of the light outlet portion O.

The light permeable component 13 is, for example, in a ring shape and surrounds the central line C, and the light permeable component 13 is made of a plastic material with high transmittance, such as polycarbonate (i.e., PC) or polymethyl methacrylate (i.e., PMMA). The light permeable component 13 is disposed on the back cover 1112 and is located between the light outlet portion O and the accommodation recess 1122. Two sides of the light permeable component 13 are respectively connected to the inner peripheral edges 11122 and 11123, and the light permeable component 13 covers the exposed area 11221.

In this embodiment, the light emitting module 12 is disposed close to the light outlet portion O and is located in the hidden area 11222 of the accommodation recess 1122 of the casing 11, and the normal line N of the light emitting surface 1221 of the light emitting module 12 is non-parallel and non-perpendicular to the opening direction D of the light outlet portion O of the casing 11, which allows the light emitting module 12 not to right face the light outlet portion O, but still enables light emitted therefrom to pass through the light outlet portion O. As a result, when a user watches the accommodation recess 1122 through the light outlet portion O along the opening direction D of the light outlet portion O, it is uneasy to see the light emitting module 12. Therefore, when the light emitting module 12 does not emit light, the appearance of the monitor 1 can be prevented from being affected by the light emitting module 12, thereby maintaining the aesthetic appearance of the entire monitor 1.

In this embodiment, light emitted by the light emitting units 122 of the light emitting module 12 can pass through the light permeable component 13 so as to be incident on a wall behind the monitor 1. As a result, when the user right faces the display panel 20 of the monitor 1, the user can see that there is a halo surrounding the monitor 1 on the wall behind the monitor 1, thereby improving the user's experience of the monitor 1.

In addition, the first inner side surface 11212 is at the obtuse angle θ to the inner bottom surface 11211, and the light emitting module 12 is disposed on the first inner side surface 11212, which enables the light emitting module 12 to emit light outwards to a periphery of the monitor 1, thereby ensuring the halo on the wall behind the monitor 1 not to be blocked by the monitor 1.

Note that the light emitting module 12 is not restricted to being disposed on the first inner side surface 11212. In some other embodiments, the light emitting module may be disposed on the second inner side surface, and light emitted by the light emitting module can be reflected to emit outwards to a periphery of the monitor.

On the other hand, the obtuse angle θ formed between the first inner side surface 11212 and the inner bottom surface 11211 falls within the range from 135 degrees to 160 degrees, which can ensure uniformity, shape and illuminance of the halo produced by the light emitted by the light emitting module 12 to meet the requirements.

Note that the obtuse angle θ formed between the first inner side surface 11212 and the inner bottom surface 11211 is not restricted to falling within the aforementioned range and may be modified according to the desired uniformity, shape and illuminance of the halo. In addition, the uniformity, shape and illuminance of the halo may be modified by adjusting the number, density, arrangement manner and positions (e.g., relative to the light outlet portion O) of the light emitting units of the light emitting module.

In this embodiment, the light permeable component 13 is disposed at the light outlet portion O, which can soften light emitted by the light emitting units 122 of the light emitting module 12 for reducing stimulation and damage of light to eyes and achieving the desired uniformity, shape and illuminance of the halo.

Note that the light permeable component of the disclosure may be provided with micro structures to further soften light emitted by the light emitting units 122 of the light emitting module 12 for achieving the desired uniformity, shape and illuminance of the halo and further reducing stimulation and damage of light to eyes. In addition, when the light emitting module 12 does not emit light, the micro structures of the light permeable component can refract or scatter external light. Therefore, when the user watches the accommodation recess 1122 through the light permeable component with a large view angle, the user may see a blurred and unclear profile of the light emitting module 12 at most, thereby maintaining the aesthetic appearance of the entire monitor 1.

Then, the following paragraphs will introduce the light permeable components with the micro structures, and the light permeable components described later can replace the light permeable component 13 in FIGS. 1 to 5.

Figure 6:
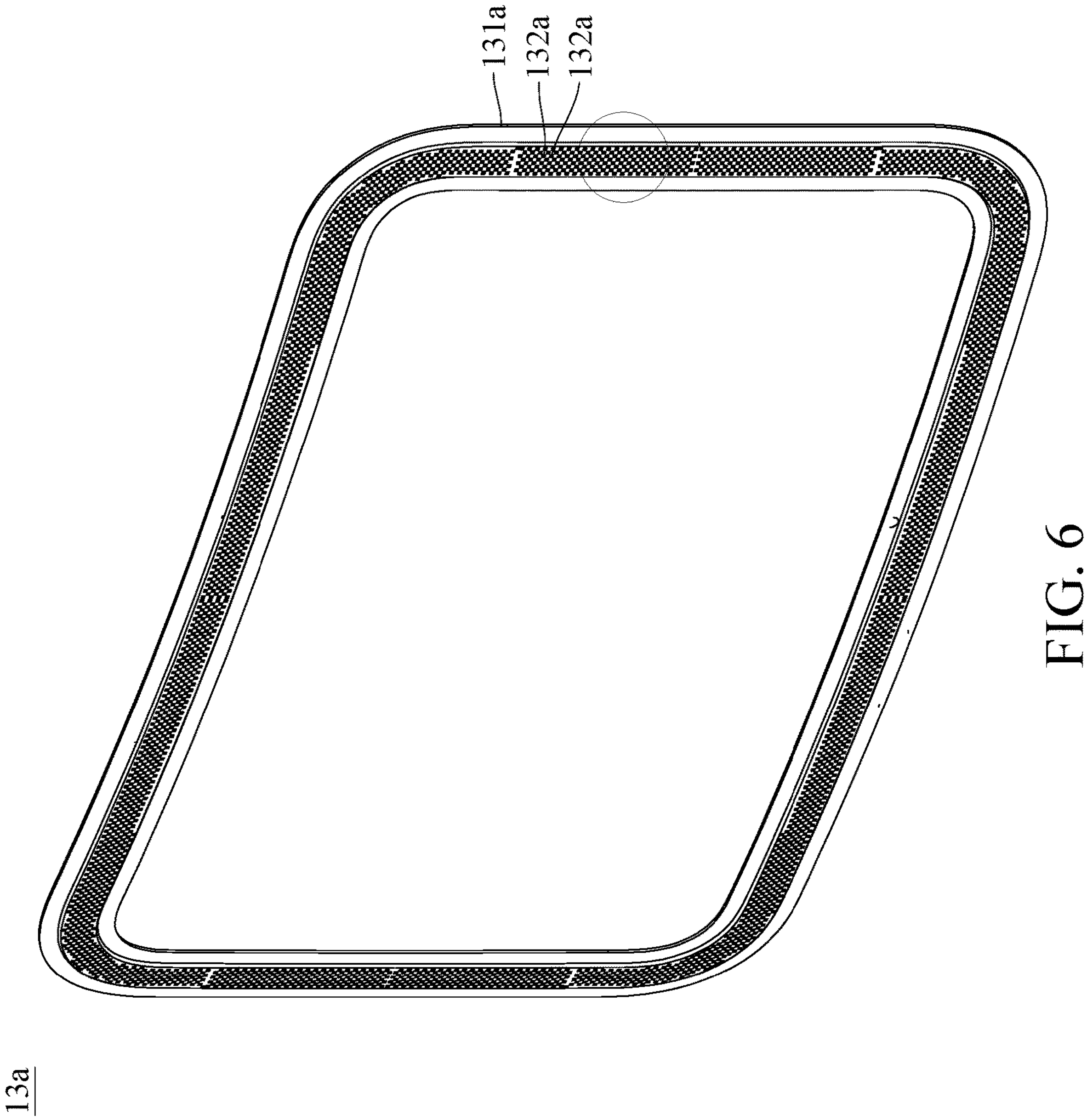
FIG. 6 is a perspective view of a light permeable component according to a second embodiment of the disclosure.
Figure 7:
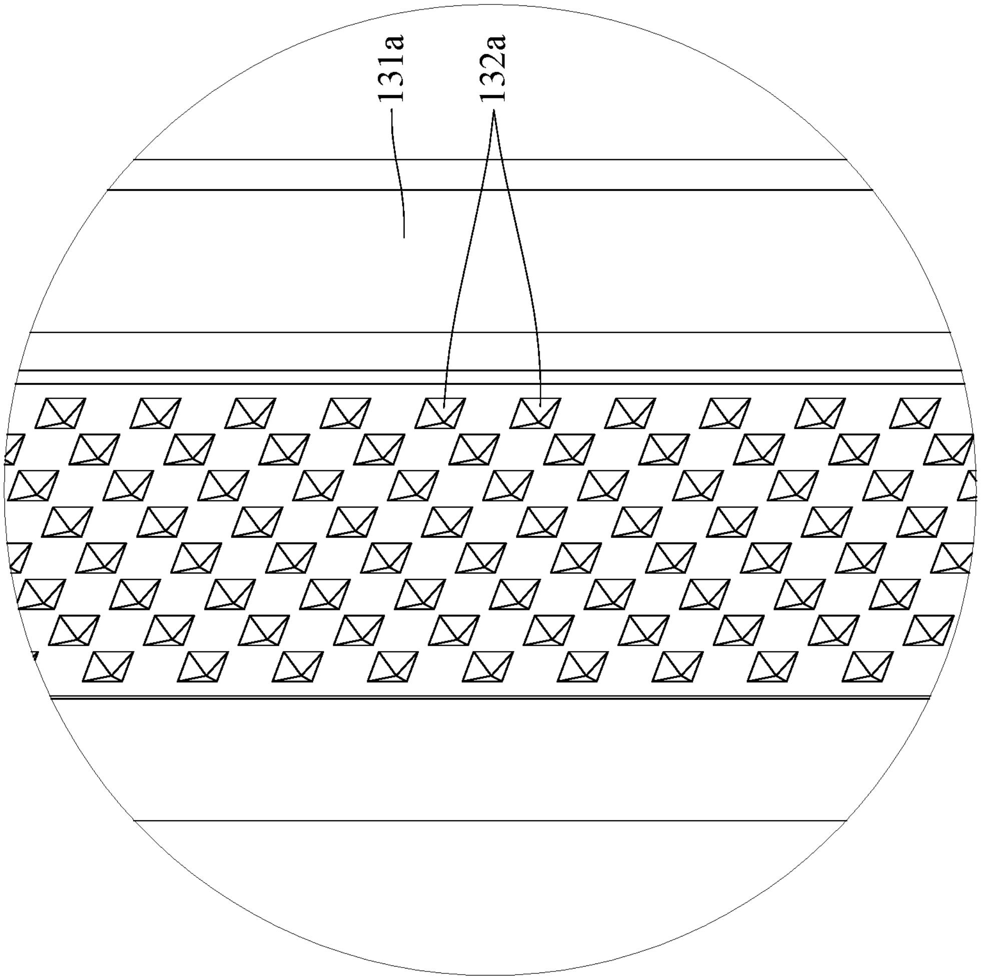

Referring to FIGS. 6 and 7, FIG. 6 is a perspective view of a light permeable component 13*a* according to a second embodiment of the disclosure, and FIG. 7 is a partial and enlarged perspective view of the light permeable component 13*a* in FIG. 6. In this embodiment, the light permeable component 13*a* includes a main portion 131*a* and a plurality of diffusion structures 132*a*. The main portion 131*a* is disposed in the light outlet portion O (e.g., shown in FIG. 5) and is located between the inner peripheral edges 11122 and 11123 (e.g., shown in FIG. 5) of the light outlet portion O. The diffusion structures 132*a* protrude from one side of the main portion 131*a* located farther away from the accommodation recess 1122 (e.g., shown in FIG. 5). The diffusion structures 132*a* are arranged around the central line C (e.g., shown in FIG. 4), and the diffusion structures 132*a* are tapered bumps, such as pyramid bumps.

Figure 8:
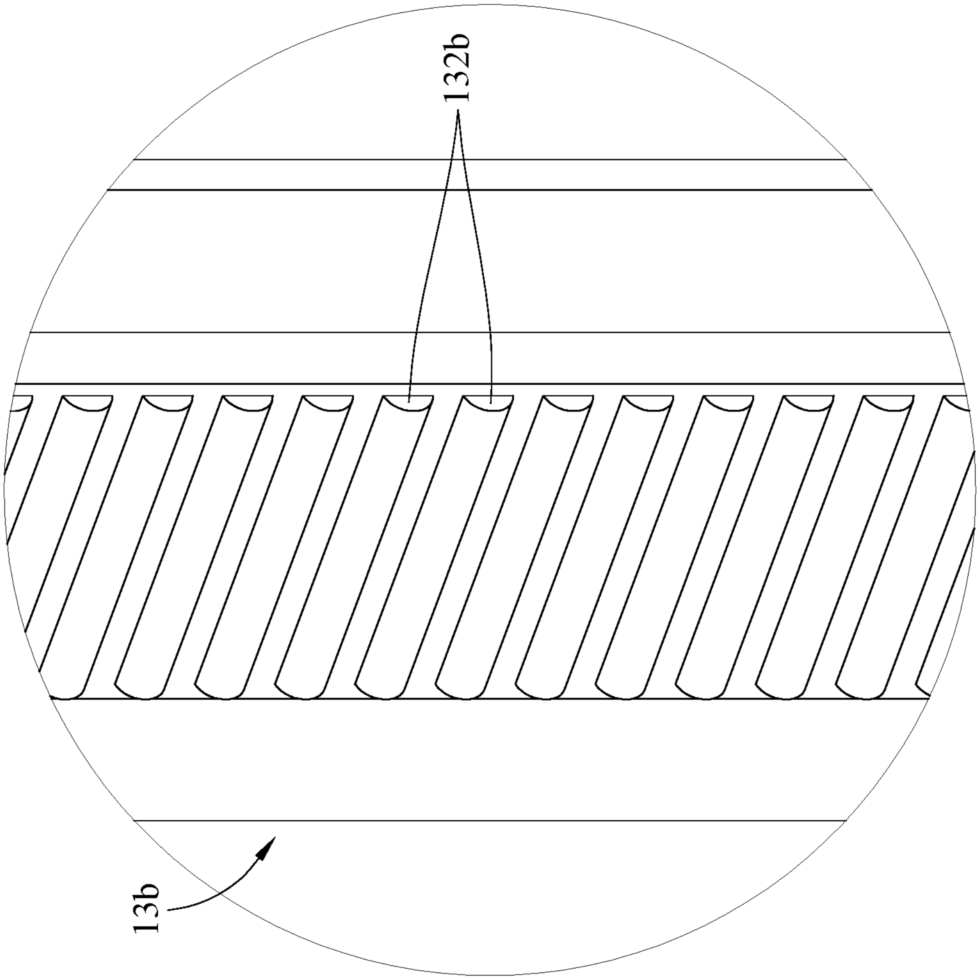
FIG. 8 is a partial and enlarged perspective view of a light permeable component according to a third embodiment of the disclosure.

Referring to FIG. 8, FIG. 8 is a partial and enlarged perspective view of a light permeable component 13*b* according to a third embodiment of the disclosure. In this embodiment, the diffusion structures 132*b* of the light permeable component 13*b* are half-cylinders.

Figure 9:
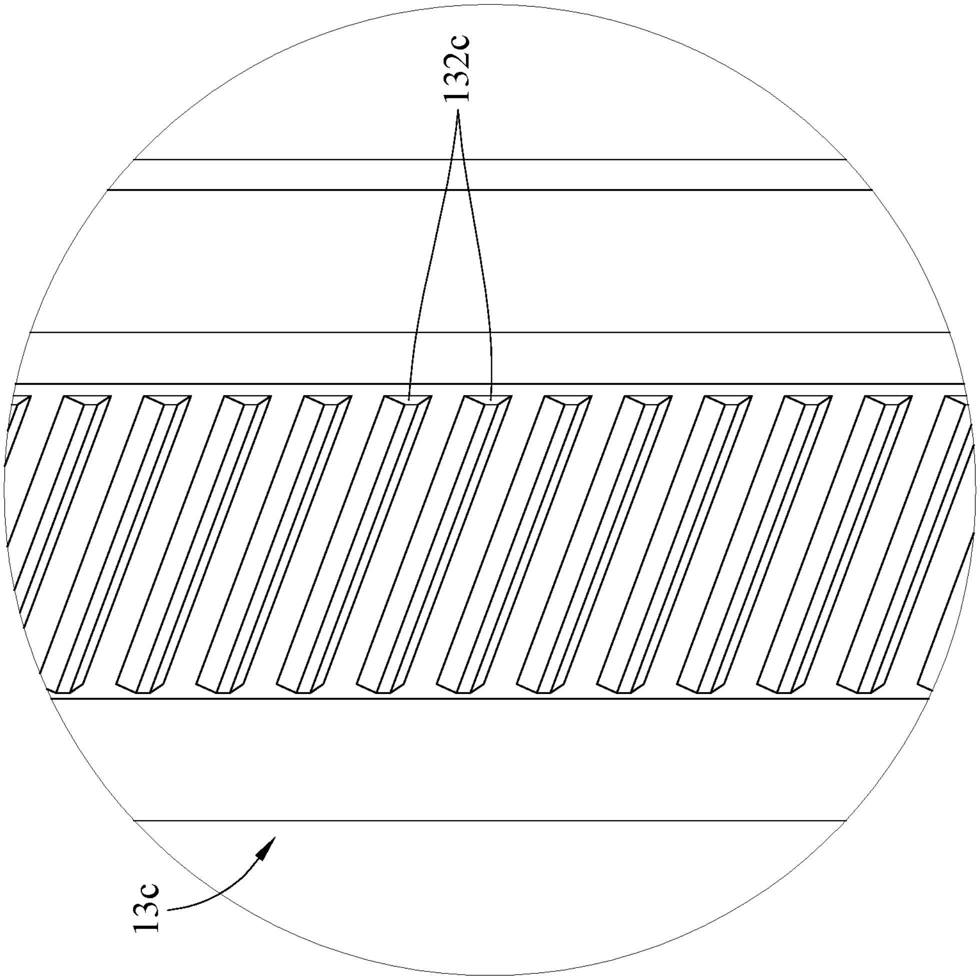
FIG. 9 is a partial and enlarged perspective view of a light permeable component according to a fourth embodiment of the disclosure.

Then, referring to FIG. 9, FIG. 9 is a partial and enlarged perspective view of a light permeable component 13*c* according to a fourth embodiment of the disclosure. In this embodiment, the diffusion structures 132*d* of the light permeable component 13*d* may be trapezoidal prisms.

Figure 10:
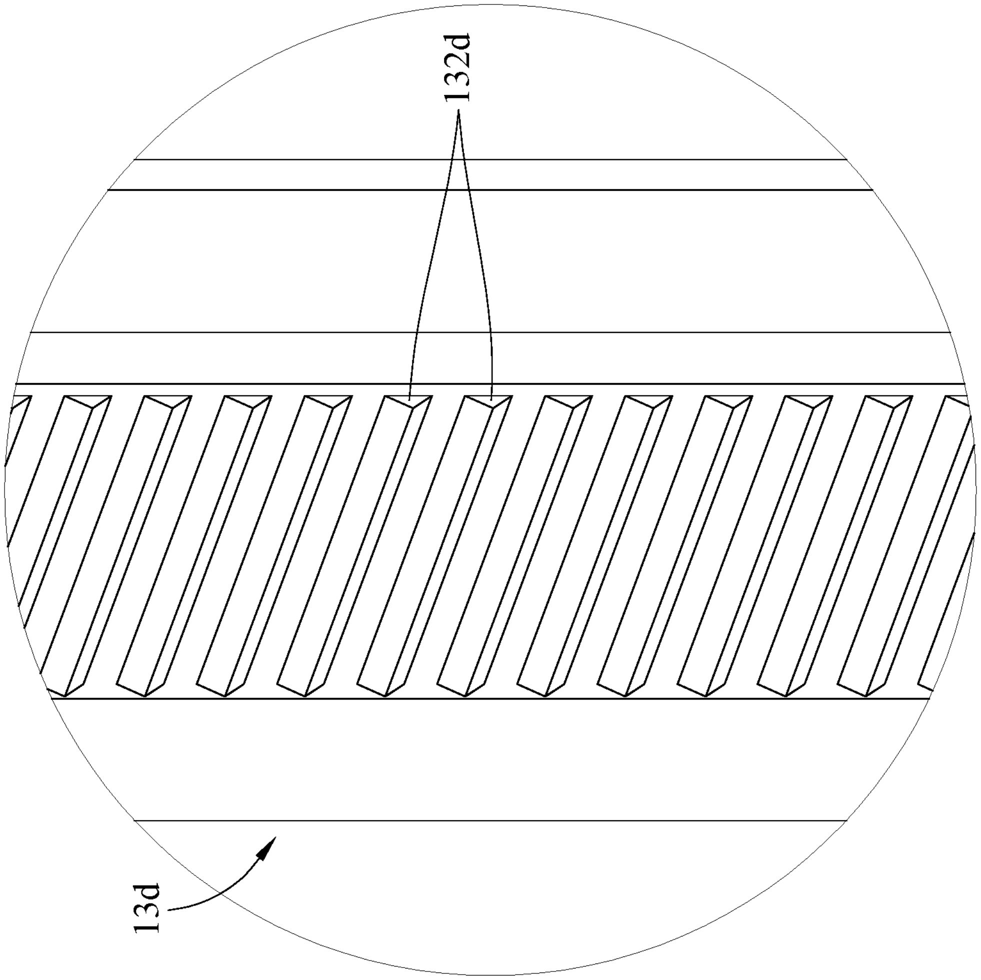
FIG. 10 is a partial and enlarged perspective view of a light permeable component according to a fifth embodiment of the disclosure.

Then, referring to FIG. 10, FIG. 10 is a partial and enlarged perspective view of a light permeable component 13*d* according to a fifth embodiment of the disclosure. In this embodiment, the diffusion structures 132*c* of the light permeable component 13*c* may be isosceles triangular prisms.

Figure 11:
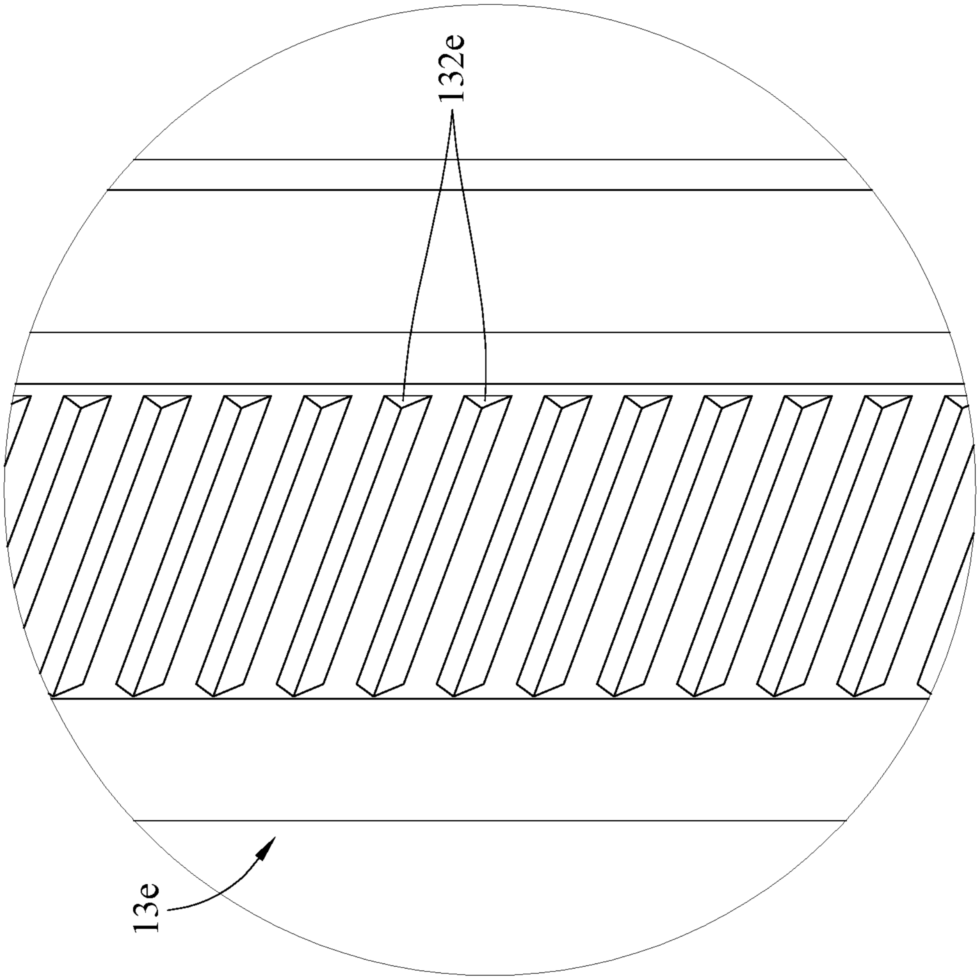
FIG. 11 is a partial and enlarged perspective view of a light permeable component according to a sixth embodiment of the disclosure.

Then, referring to FIG. 11, FIG. 11 is a partial and enlarged perspective view of a light permeable component 13*e* according to a sixth embodiment of the disclosure. In this embodiment, the diffusion structures 132*c* of the light permeable component 13*c* may be scalene triangular prisms.

Figure 12:
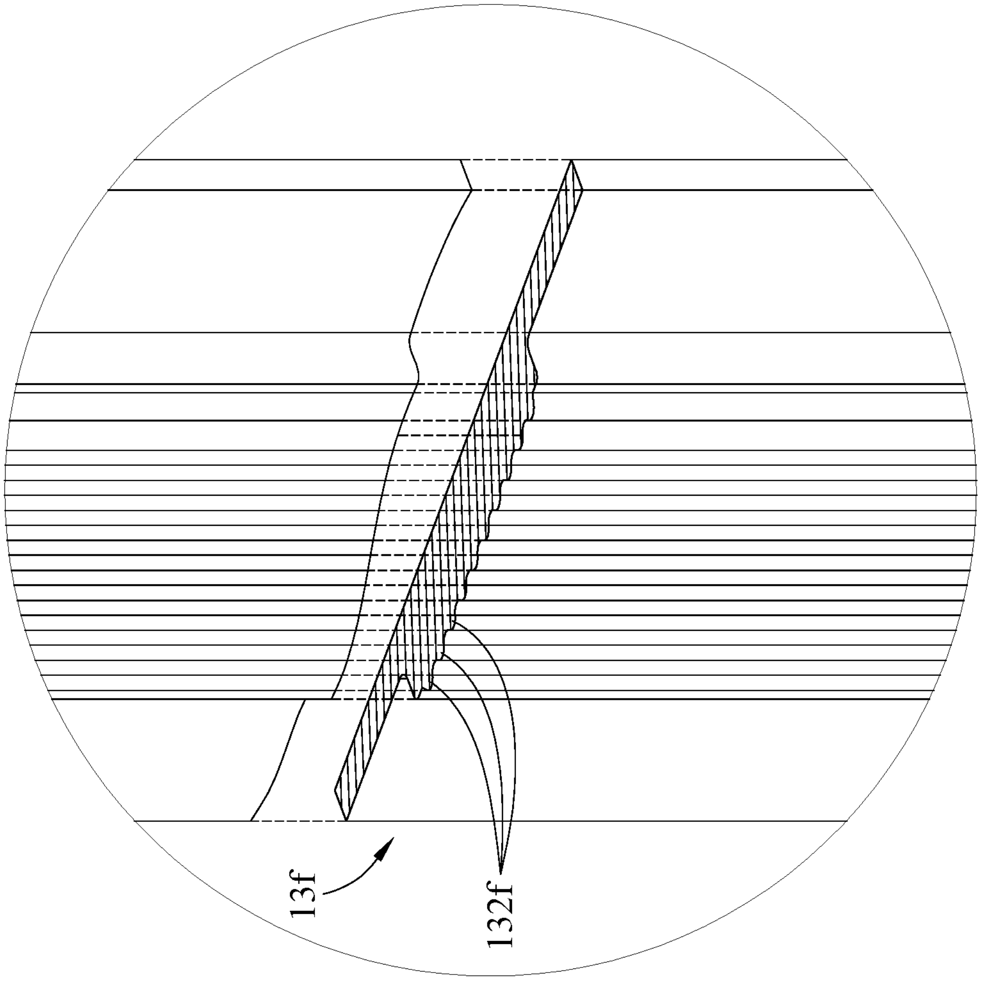
FIG. 12 is a partial and enlarged perspective view of a light permeable component according to a seventh embodiment of the disclosure.

Then, referring to FIG. 12, FIG. 12 is a partial and enlarged perspective view of a light permeable component 13*f* according to a seventh embodiment of the disclosure. In this embodiment, the diffusion structures 132*f* of the light permeable component 13*f* are ring-shaped protrusion structures, and the diffusion structures 132*f* are spaced apart from the central line C (e.g., shown in FIG. 4) by different distances.

Note that the aforementioned light permeable component, the accommodation component, the light outlet portion and the light emitting module are not restricted to being in the ring shape and may be modified to another shape (e.g., a straight shape or a curved shape) according to actual requirements.

According to the casing assembly and the monitor as discussed in the above embodiments, the light emitting module is hidden in the accommodation recess of the casing and is disposed close to the light outlet portion, and the normal line of the light emitting surface of the light emitting module is non-parallel and non-perpendicular to the opening direction of the light outlet portion of the casing, which allows the light emitting module not to right face the light outlet portion, but still enables light emitted therefrom to pass through the light outlet portion. As a result, when a user watches the accommodation recess through the light outlet portion along the opening direction of the light outlet portion, it is uneasy to see the light emitting module. Therefore, when the light emitting module does not emit light, the appearance of the monitor can be prevented from being affected by the light emitting module, thereby maintaining the aesthetic appearance of the entire monitor.

In addition, the light emitting module is located in the hidden area of the accommodation recess, which can further improve the effect of hiding the light emitting module for ensuring the aesthetic appearance of the entire monitor to be maintained while the light emitting module does not emit light.

Moreover, the light permeable component is disposed at the light outlet portion, which can soften light emitted by the light emitting units of the light emitting module for reducing stimulation and damage of light to eyes and achieving the desired uniformity, shape and illuminance of the halo.

Furthermore, the light permeable component may be provided with micro structures to further soften light emitted by the light emitting units of the light emitting module for achieving the desired uniformity, shape and illuminance of the halo and further reducing stimulation and damage of light to eyes. In addition, when the light emitting module does not emit light, the micro structures of the light permeable component can refract or scatter external light. Therefore, when the user watches the accommodation recess through the light permeable component with a large view angle, the user may see a blurred and unclear profile of the light emitting module at most, thereby maintaining the aesthetic appearance of the entire monitor.

It will be apparent to those skilled in the art that various modifications and variations can be made to the present disclosure. It is intended that the specification and examples be considered as exemplary embodiments only, with a scope of the disclosure being indicated by the following claims and their equivalents.

What is claimed is:

1. A casing assembly, comprising:

a casing, provided with an accommodation recess formed by an inner wall surface and a light outlet portion formed by two inner peripheral edges, wherein the accommodation recess communicates with the light outlet portion; and a light emitting module, disposed in the accommodation recess of the casing and located close to the light outlet portion, wherein the light emitting module is provided with a light emitting surface, and a normal line of the light emitting surface is non-parallel and non-perpendicular to an opening direction of the light outlet portion;

wherein the inner wall surface comprises an inner bottom surface, a first inner side surface and a second inner side surface, the first inner side surface and the second inner side surface are respectively connected to two opposite sides of the inner bottom surface, the first inner side surface is at an obtuse angle to the inner bottom surface, and the light emitting module is disposed on the first inner side surface.

2. The casing assembly according to claim 1, wherein an imaginary extension surface of one of the two inner peripheral edges of the light outlet portion extends towards the accommodation recess so as to divide the accommodation recess into an exposed area and a hidden area, the exposed area directly communicates with the light outlet portion, and the light emitting module is located in the hidden area.

3. The casing assembly according to claim 2, wherein the imaginary extension surface extends along a direction parallel to the opening direction of the light outlet portion so as to divide the accommodation recess into the exposed area and the hidden area.

4. The casing assembly according to claim 1, wherein the casing has an outer peripheral edge, and the first inner side surface is located farther away from the outer peripheral edge than the second inner side surface.

5. The casing assembly according to claim 1, wherein the obtuse angle falls within a range from 135 degrees to 160 degrees.

6. The casing assembly according to claim 1, wherein the casing comprises a main body and an accommodation component, the main body comprises a frame and a back cover assembled with each other, the frame and the back cover together form an inner space, the light outlet portion is located at the back cover, the accommodation component is disposed on the back cover and located in the inner space, and the accommodation component comprises the accommodation recess.

7. The casing assembly according to claim 6, further comprising a light permeable component, wherein the light permeable component is disposed on the back cover and is located between the light outlet portion and the accommodation recess.

8. The casing assembly according to claim 7, wherein the light permeable component comprises a main portion and a plurality of diffusion structures, the main portion is located between the two inner peripheral edges of the casing and is disposed in the light outlet portion, and the plurality of diffusion structures protrude from one side of the main portion located farther away from the accommodation recess.

9. The casing assembly according to claim 8, wherein the accommodation recess, the light outlet portion, the light emitting module and the light permeable component surround a central line so as to be in a ring shape, the plurality of diffusion structures are arranged around the central line, and the plurality of diffusion structures are trapezoidal prisms, half-cylinders, triangular prisms or tapered bumps.

10. The casing assembly according to claim 8, wherein the accommodation recess, the light outlet portion, the light emitting module and the light permeable component surround a central line so as to be in a ring shape, and the plurality of diffusion structures are in a ring shape and are spaced apart from the central line by different distances.

11. A monitor, comprising:

a casing assembly, comprising:

a casing, provided with an accommodation recess formed by an inner wall surface and a light outlet portion formed by two inner peripheral edges, wherein the accommodation recess communicates with the light outlet portion; and a light emitting module, disposed in the accommodation recess of the casing and located close to the light outlet portion, wherein the light emitting module is provided with a light emitting surface, and a normal line of the light emitting surface is non-parallel and non-perpendicular to an opening direction of the light outlet portion; and a display panel, disposed on the casing;

wherein the inner wall surface comprises an inner bottom surface, a first inner side surface and a second inner side surface, the first inner side surface and the second inner side surface are respectively connected to two opposite sides of the inner bottom surface, the first inner side surface is at an obtuse angle to the inner bottom surface, and the light emitting module is disposed on the first inner side surface.

12. The monitor according to claim 11, wherein an imaginary extension surface of one of the two inner peripheral edges of the light outlet portion extends towards the accommodation recess so as to divide the accommodation recess into an exposed area and a hidden area, the exposed area directly communicates with the light outlet portion, and the light emitting module is located in the hidden area.

13. The monitor according to claim 12, wherein the imaginary extension surface extends along a direction parallel to the opening direction of the light outlet portion so as to divide the accommodation recess into the exposed area and the hidden area.

14. The monitor according to claim 11, wherein the casing has an outer peripheral edge, and the first inner side surface is located farther away from the outer peripheral edge than the second inner side surface.

15. The monitor according to claim 11, wherein the obtuse angle falls within a range from 135 degrees to 160 degrees.

16. The monitor according to claim 11, wherein the casing comprises a main body and an accommodation component, the main body comprises a frame and a back cover assembled with each other, the frame and the back cover together form an inner space, the display panel is at least partially located in the inner space, the light outlet portion is located at the back cover, the accommodation component is disposed on the back cover and located in the inner space, and the accommodation component comprises the accommodation recess.

17. The monitor according to claim 16, wherein the casing assembly further comprises a light permeable component, and the light permeable component is disposed on the back cover and is located between the light outlet portion and the accommodation recess.

18. The monitor according to claim 17, wherein the light permeable component comprises a main portion and a plurality of diffusion structures, the main portion is located between the two inner peripheral edges of the casing and is disposed in the light outlet portion, and the plurality of diffusion structures protrude from one side of the main portion located farther away from the accommodation recess.

19. The monitor according to claim 18, wherein the accommodation recess, the light outlet portion, the light emitting module and the light permeable component surround a central line so as to be in a ring shape, the plurality of diffusion structures are arranged around the central line, and the plurality of diffusion structures are trapezoidal prisms, half-cylinders, triangular prisms or pyramid bumps.

20. The monitor according to claim 18, wherein the accommodation recess, the light outlet portion, the light emitting module and the light permeable component surround a central line so as to be in a ring shape, and the plurality of diffusion structures are in a ring shape and are spaced apart from the central line by different distances.

* * * * *